United States Patent
Smolarsky

(10) Patent No.: US 12,117,934 B2
(45) Date of Patent: Oct. 15, 2024

(54) METHOD AND SYSTEM FOR SHARING MEMORY BETWEEN PROCESSORS BY UPDATING SHARED MEMORY SPACE INCLUDING FUNTIONALITY TO PLACE PROCESSORS INTO IDLE STATE

(71) Applicant: ATI Technologies ULC, Markham (CA)

(72) Inventor: Dror Smolarsky, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/218,082

(22) Filed: Mar. 30, 2021

(65) Prior Publication Data
US 2022/0318137 A1    Oct. 6, 2022

(51) Int. Cl.
 *G06F 12/06*    (2006.01)
 *G06F 9/4401*    (2018.01)

(52) U.S. Cl.
 CPC ........ *G06F 12/0646* (2013.01); *G06F 9/4418* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 6,199,179 B1 * | 3/2001 | Kauffman | G06F 9/5077 714/11 |
| 2006/0036889 A1 * | 2/2006 | Arai | G06F 11/203 714/1 |
| 2009/0164752 A1 * | 6/2009 | McConnell | G06F 11/3017 712/16 |
| 2010/0017456 A1 * | 1/2010 | Gusler | G06F 9/5011 709/202 |
| 2014/0052922 A1 * | 2/2014 | Moyer | G06F 12/0864 711/128 |
| 2017/0300427 A1 * | 10/2017 | Lin | G06F 12/128 |

OTHER PUBLICATIONS

Q. Zhang, L. Liu, C. Pu, W. Cao and S. Sahin, "Efficient Shared Memory Orchestration towards Demand Driven Memory Slicing," 2018 IEEE 38th International Conference on Distributed Computing Systems (ICDCS), 2018, pp. 1212-1223, doi: 10.1109/ICDCS.2018.00121. (Year: 2018).*

* cited by examiner

Primary Examiner — Michelle T Bechtold
Assistant Examiner — Marwan Ayash
(74) Attorney, Agent, or Firm — Volpe Koenig

(57) ABSTRACT

A method and system for sharing memory in a computer system includes placing one or more processors in the computer system in an idle state. The one or more processors are queried for associated memory space, and a shared physical memory address space is updated, wherein each processor in the system has access to the physical memory in the shared physical memory address space. The one or more processors is removed from the idle state, and work is submitted to the one or more processors for execution.

20 Claims, 5 Drawing Sheets

METHOD AND SYSTEM FOR SHARING MEMORY BETWEEN PROCESSORS BY UPDATING SHARED MEMORY SPACE INCLUDING FUNTIONALITY TO PLACE PROCESSORS INTO IDLE STATE

BACKGROUND

In systems with multiple processing units, where each processing unit has its own physical memory, each processing unit includes a separate physical memory space. In such systems, part or all of each processing unit's physical memory may be visible to the system host processor.

However, each of the processing units in the system can only access another processing unit's memory as part of the host physical memory, if it is mapped as part of the host memory. In addition, there are limitations on how much memory each device in the system can have as part of system memory, which limits the size of an individual processing unit's memory that can be shared with other processing units.

Work distribution in a conventional multiple processing unit system is managed by software that generates the workloads, and the software may only be able to provide coarsely granulated workload distribution.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for sharing memory among multiple processing units (e.g., processors) is described herein. Throughout the application below, the term "processing unit" and "processor" are typically used interchangeably.

A method for sharing memory in a computer system includes placing one or more processors in the computer system in an idle state. The one or more processors are queried for associated memory space, and a shared physical memory address space is updated, wherein each processor in the system has access to the physical memory in the shared physical memory address space. The one or more processors is removed from the idle state, and work is submitted to the one or more processors for execution.

A computer system for sharing memory includes a memory and one or more processors operatively coupled to and in communication with the memory. Each processor includes a processor specific memory. A first processor places one or more processors in the computer system in an idle state and queries the one or more processors for associated memory space. The first processor updates a shared physical memory address space, wherein each processor in the system has access to the physical memory in the shared physical memory address space. The first processor removes the one or more processors from the idle state, and submits work to the one or more processors for execution.

A non-transitory computer-readable medium for sharing memory, the non-transitory computer-readable medium having instructions recorded thereon, that when executed by the processor, cause the processor to perform operations. The operations include placing one or more processors in the computer system in an idle state. The one or more processors are queried for associated memory space, and a shared physical memory address space is updated, wherein each processor in the system has access to the physical memory in the shared physical memory address space. The one or more processors is removed from the idle state, and work is submitted to the one or more processors for execution.

Figure 1:
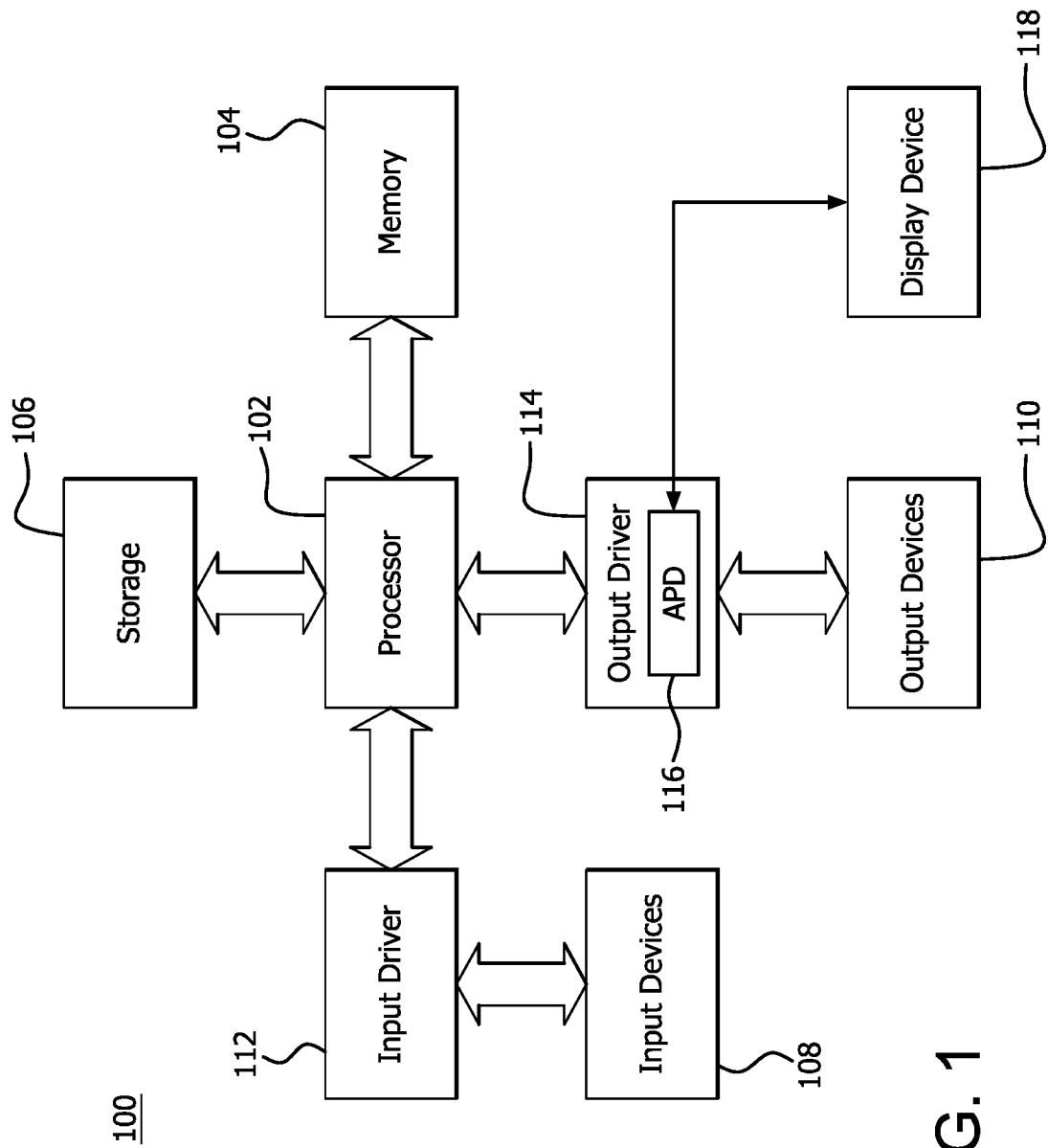
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, a server, a tablet computer or other types of computing devices for generating graphics images. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102 or is located separately from the processor 102. The memory 104 includes a volatile or non-volatile memory, for example, random access memory (RAM), dynamic RAM, or a cache. In the embodiment illustrated in FIG. 1, processor 102 includes a CPU.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108 and permits the processor 102 to receive input from the input devices 108. The output driver 114 communicates with the processor 102 and the output devices 110 and permits the processor 102 to send output to the output devices 110. It is noted that the input driver 112 and the output driver 114 are optional components, and that the device 100 will operate in the same manner if the input driver 112 and the output driver 114 are not present. In the exemplary embodiment the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm can perform the functionality described herein. Alternatively, it is contemplated that computing systems that do not perform processing tasks in accordance with a SIMD paradigm can also perform the functionality described herein.

Figure 2:
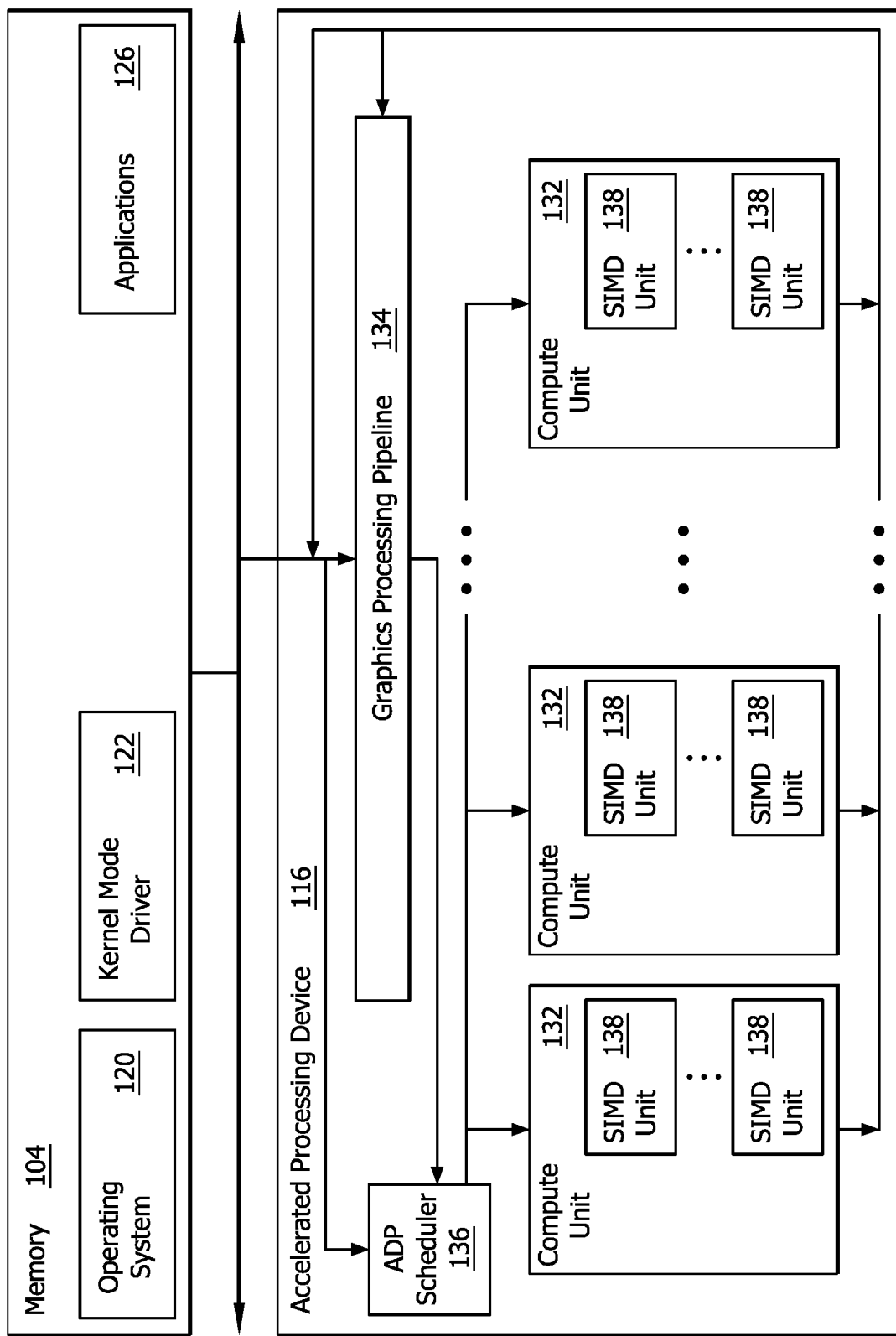
FIG. 2 is a block diagram of the device of FIG. 1, illustrating additional detail.

FIG. 2 is a block diagram of the device 100, illustrating additional details related to execution of processing tasks on the APD 116 or any example GPU. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with or using different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
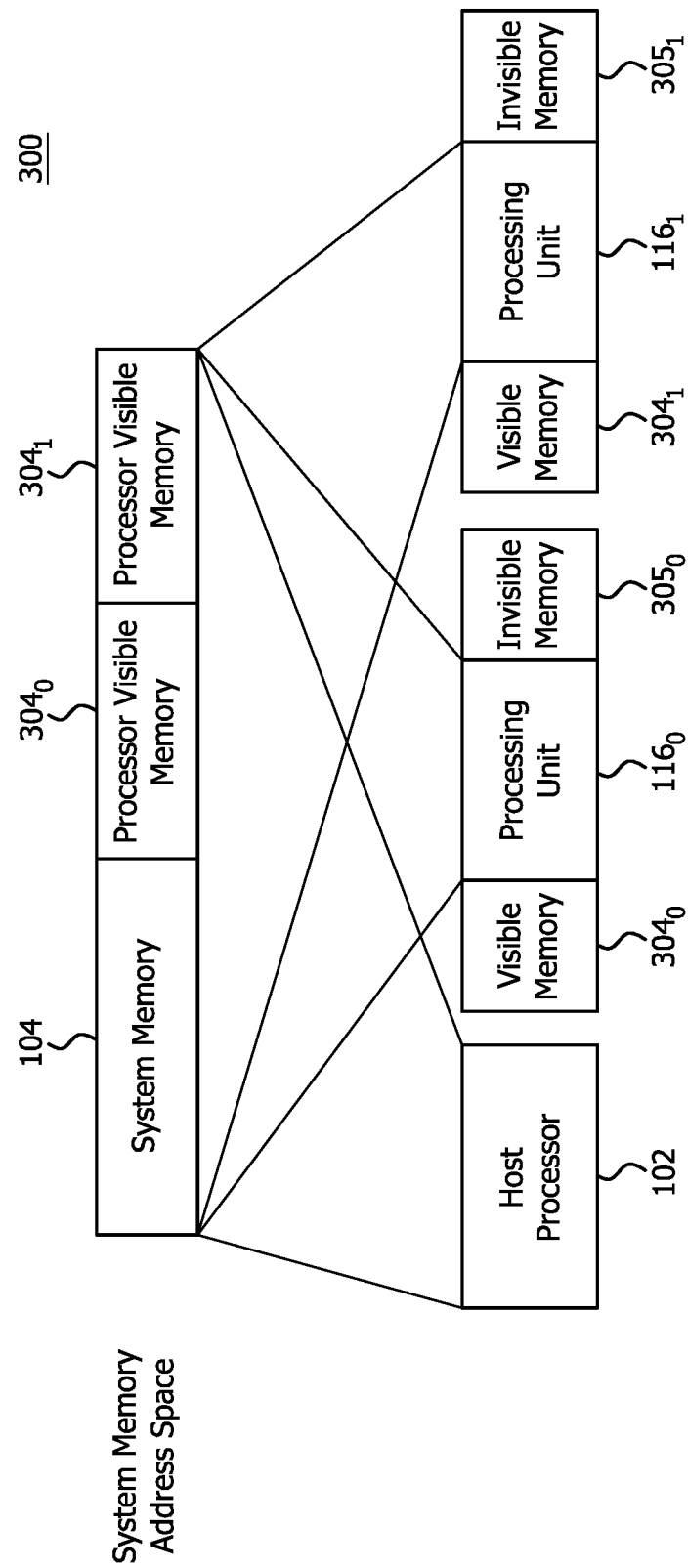
FIG. 3 is a block diagram illustrating a conventional system memory address space, according to an example.

FIG. 3 is a block diagram illustrating a conventional system memory address space, according to an example. The system memory address space includes system memory (e.g., memory 104) and processor visible memory 304 (designated $304_0$ and $304_1$). Visible memory $304_0$ is associated with processing unit $116_0$ (e.g., APD 116, a separate GPU or a processing unit within APD 116). Visible memory $304_1$ is associated with processing unit $116_1$, which again may include a processing unit within APD 116 or a separate GPU. In addition to the visible memory 304, each processing unit 116 includes invisible memory 305 (designated $305_0$ and $305_1$ for processing units $116_0$ and $116_1$, respectively).

The host processor 104 is aware of, and has access to the system memory 104 and both visible memories 304. In addition, each processing unit 116 is aware of the system memory 104, the visible memories 304 and its own respective invisible memory 305). Accordingly, the host processor 102 and processing units 116 can perform memory operations such as reads, writes and copies, for example, to the system memory 104, and processor visible memory $304_0$ and $304_1$. However, only processing unit $116_0$ can perform an operation to invisible memory $305_0$, while only processing unit $116_1$ can perform an operation to invisible memory $305_1$.

Hence, some portion of the memory specific to each processing unit (e.g., 116) in the system 100 may be included in the system memory address space. Accordingly, any processor in the system (e.g., 102, 116) can access the physical visible memory (e.g. 304) of any other processor. However, to provide access to the full range of additional memory space of each of the processing units 116, the invisible memory 305 of each processing unit 116 would need to visible to all of the processors in the system. In one example, visible memory is allocated by the operating system (OS) and the system driver, and may be limited by the amount of kernel space available. For example, a GPU may be limited to 256 MB of visible memory, or may not be limited to that amount, but another amount determined by the OS and/or system driver.

Figure 4:
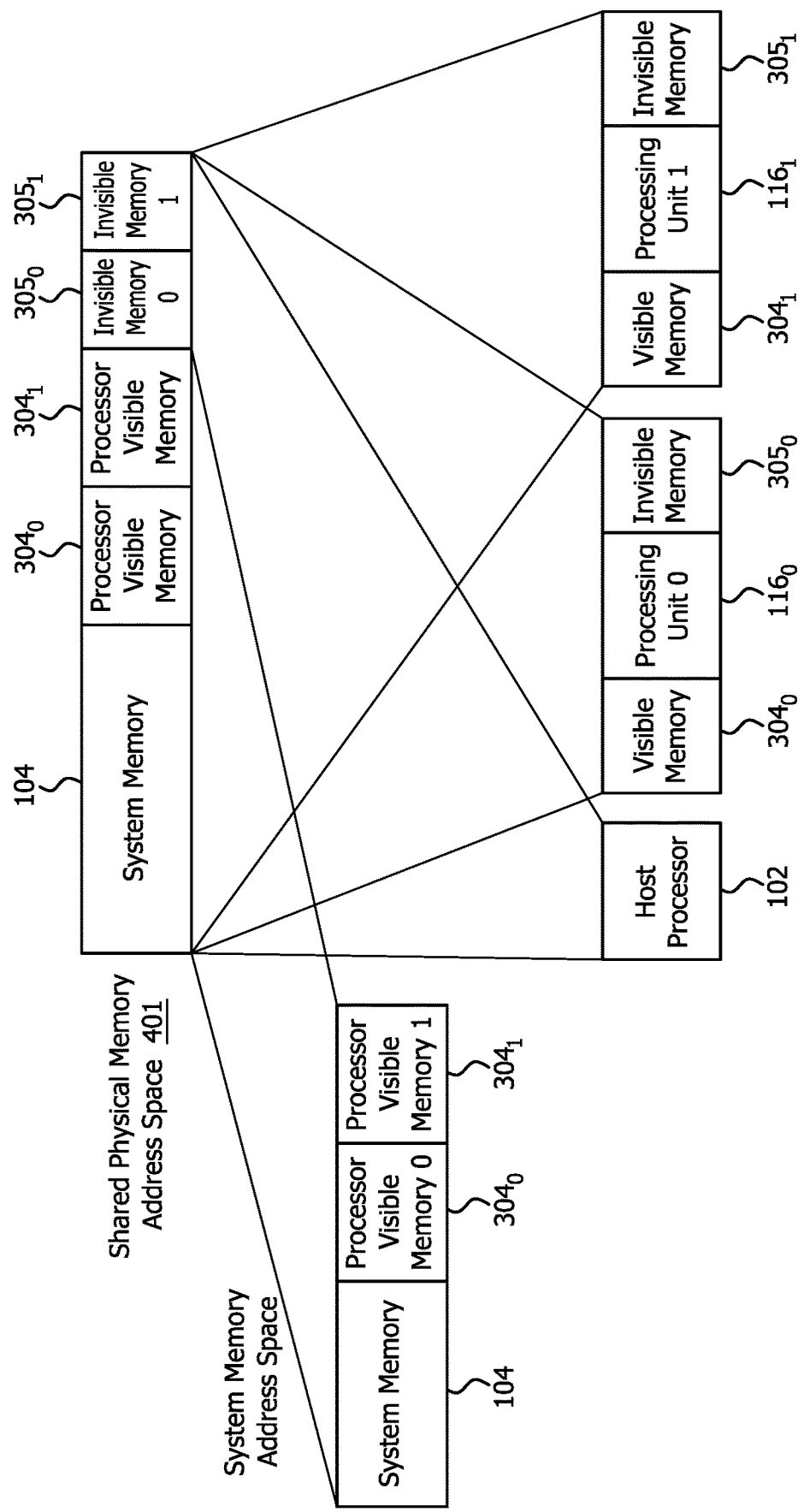
FIG. 4 is a block diagram illustrating a shared physical memory address space, according to an example.

FIG. 4 is a block diagram illustrating a shared physical memory address space 401, according to an example. Similar to FIG. 3, the shared physical memory address space 401 includes the conventional system memory address space, (e.g., system memory 104, processor visible memory 304), but additionally includes the invisible memory 305 allocated to each processor.

That is, in the example shown in FIG. 4, host processor 102, processing unit 0 and processing unit 1 are all aware of not only the system memory 104 and visible memories 304 of one another, but also the invisible memories 305. As a result, more memory space becomes available to each processor and each processor can access and perform operations to a broader range of memory areas directly, without the need to copy data first to the system memory address space.

In order to provide each processor with access to the shared physical memory address space 401, each processor must be queried for its memory so that each processor can be made aware of the entire memory available. That is, to enable each processing unit to access the full range of physical memory in other processing units, each processing unit need knowledge of the system wide indices of all the processing units in the system (e.g., system 100) and the physical memory size (visible 304 and invisible 305) of all the processing units in the system.

Figure 5:
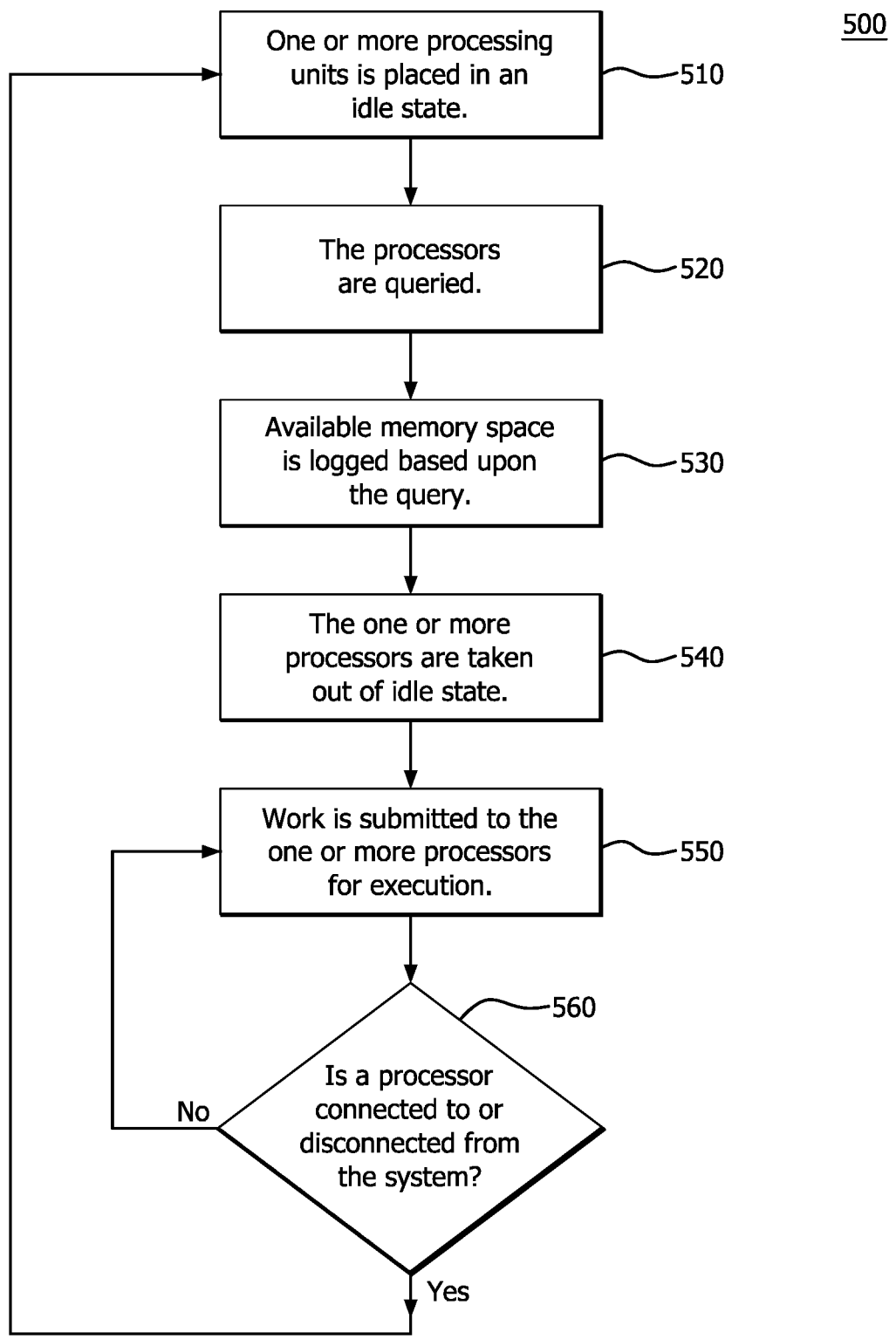
FIG. 5 is an example flow diagram of a method for sharing memory.

FIG. 5 is an example flow diagram 500 of a method for sharing memory. The method may commence upon bootup or upon a processor being connected to or disconnected from the system.

In step 510, one or more processing units is placed in an idle state. In an example, all processors in the system 100 are placed in the idle state, whereas in another example only a processor being connected to the system or disconnected from the system is placed in the idle state.

This may be accomplished in several ways, for example. In one example, no additional work is submitted to any processing unit in the system, while the system awaits for all the processors in the system to be rendered idle. In another example, all the work submitted to all the processing units is pre-empted and resubmitted once the updating is completed.

In step 520, the processors are queried for information. During the query, each processor responds with an index of that processor for identification as well as the invisible memory size (e.g., 305 of FIG. 4) associated with that processor. The query process may be initiated by the host operating system (OS) or host driver. As described above, the query process may be triggered upon powerup or when a processor is added or removed from the system.

Once the query is complete, the available memory space is logged based upon the query (step 530). In addition, the shared physical memory address space is configured. The information may be stored, for example on the host system in a hardware module not associated with a particular processing unit. Alternatively, the information received from the query may be stored in publicly available buffers/registers in the host processor 102 or in the primary processing unit 116 (e.g., processing unit 0). In another example, the information may be stored in a memory area of each processing unit, which may provide more rapid access to the information.

In one example, the first portion of the data relating to the shared physical memory address space may be the system memory address space followed by the invisible memory for each processing unit in order of the processing unit's index.

The information may be stored in a processor virtual table that is updated. For example, the processing unit's translation lookup table (TLB) is cleared, and then the driver updates the virtual table for that processing unit. This may be performed iteratively over every entry in the table. The value of the physical address is changed by adding the delta between the previous shared start physical address of the processing unit to the new shared start physical address of the processing unit. In such manner, the data is updated to show either a reduction or addition of memory available in the shared physical memory address space.

Once the update is complete, the one or more processors are taken out of the idle state (step 540) and work is submitted (or resubmitted) to the one or more processors for execution (step 550). If no processors are connected to or disconnected from the system (step 560), then the method reverts to step 550 where work continues to be submitted to the one or more processors for execution. However, if a processor is connected to or disconnected from the system in step 560, the method reverts to step 510.

The processor being connected to, or disconnected from, the system in step 560 may be an internal processor within the system 100 or it may be a processor external to the system 100. For example, an additional device (e.g., a laptop) may be connected via the input device 108 that includes one or more processors that include memory for sharing. In this manner, external devices may be provided access to the shared physical memory space 401 for use, as well as share memory to the processors within system 100.

If all of the processing units 116 in the system 100 include the same physical address ranges, the sequence of performing a dynamic (e.g., when a processor is connected or disconnected) update may be modified. For example, after a disconnected processing unit is placed into the idle state, the physical address range of that processing unit in the shared physical memory address space may be left empty, and any work pre-empted from that processing unit is submitted to a processing unit still connected to the system 100. Also, when a processing unit is connected to the system, the newly connected processing units physical address range is simply updated into the shared physical memory address space based upon the processing unit's index, as the size is already known and need not be queried.

The above method can be utilized on any multiprocessor system (e.g., a multi-CPU system or multi-GPU system) to allocate memory beyond the system memory. Accordingly, copy time may be saved and execution times reduced by utilizing shared memory in the multiprocessor system.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, can be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The above techniques provide for increased memory usage by sharing memory that would ordinarily only be accessible by a single processor (e.g., processing unit). By providing access to invisible memory to other processors in the system, data that would have to be copied to the system memory address space, and then read from that space to the invisible memory of another processor can be written directly to that processor's invisible memory space by another processor for use. Accordingly, processing delays may be avoided. Additionally, an external device connected to the system may provide access to its memory for use by processors within the system as well as utilize memory areas within the system directly.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for sharing memory in a computer system, comprising:
    placing one or more processors in the computer system in an idle state;
    querying the one or more processors for an invisible memory associated with each of the one or more processors;
    updating a shared physical memory address space to include the invisible memory associated with at least one of the one or more processors wherein data stored in the shared physical memory address space is accessible to each of the one or more processors;
    removing the one or more processors from the idle state upon performing the updating of the shared physical memory address space; and
    submitting work to the one or more processors for execution.

2. The method of claim 1, wherein the placing of the one or more processors in the idle state is performed upon a system startup of the computer system.

3. The method of claim 1, further comprising connecting an additional processor to the one or more processors of the computer system.

4. The method of claim 3, further comprising placing only the additional processor in the idle state, querying only the additional processor for invisible memory associated with the additional processor, and removing the additional processor from the idle state upon updating the shared physical memory address space.

5. The method of claim 3, further comprising updating the shared physical memory address space without placing the additional processor into the idle state.

6. The method of claim 1, further comprising disconnecting a particular processor among the one or more processors from the computer system.

7. The method of claim 6, further comprising updating the shared physical memory address space based upon the particular processor being disconnected.

8. The method of claim 7, further comprising submitting work for disconnecting the particular processor to another processor among the one or more processors.

9. The method of claim 1, further comprising each of the one or more processors:
    submitting an index relating to each processor and an amount of available memory space for sharing in the shared physical memory address space.

10. A computer system, comprising:
    a memory;
    one or more processors communicatively coupled to and the memory, each processor including a processor specific memory; and
    a first processor communicatively coupled to the one or more processors, wherein the first processor is configured to:
    place the one or more processors in an idle state;
    query the one or more processors for invisible memory associated with each of the one or more processors;
    update a shared physical memory address space to include the invisible memory associated with at least one of the one or more processors, wherein data stored in the shared physical memory address space is accessible to each of the one or more processors;
    remove the one or more processors from the idle state upon updating of the shared physical memory address space; and
    submit work to the one or more processors for execution.

11. The computer system of claim 10, wherein the first processor is configured to place the one or more processors in the idle state upon a system startup of the computer system.

12. The computer system of claim 10, wherein the first processor is configured to detect an additional processor has been added to one or more processors of the computer system.

13. The computer system of claim 12, wherein the first processor is configured to place only the additional processor in the idle state, query only the additional processor for invisible memory associated with the additional processor, and remove the additional processor from the idle state upon updating the shared physical memory address space.

14. The computer system of claim 12, wherein the first processor is configured to update the shared physical memory address space without placing the additional processor into the idle state.

15. The computer system of claim 10, further wherein the first processor is configured to detect a particular processor among the one or more processors is disconnected from the computer system.

16. The computer system of claim 15, wherein the first processor is configured to update the shared physical memory address space based upon the particular processor being disconnected.

17. The computer system of claim 16, wherein the first processor is configured to submit work for disconnecting processor to another processor among the one or more processors of the computer system.

18. The computer system of claim 10, wherein each processor among the one or more processors submits an index relating to each processor and an amount of available memory space for sharing in the shared physical memory address space.

19. A non-transitory computer-readable medium for sharing memory, the non-transitory computer-readable medium having instructions recorded thereon, that when execute by a processor, cause the processor to perform operations including:

placing one or more processors in a computer system in an idle state;

querying the one or more processors for an invisible memory associated with each of the one or more processors;

updating a shared physical memory address space to include the invisible memory associated with at least one of the one or more processors, wherein data stored in the shared physical memory address space is accessible to each of the one or more processors;

removing the one or more processors from the idle state upon performing the updating of the shared physical memory address space; and submitting work to the one or more processors for execution.

20. The non-transitory computer-readable medium of claim 19, further comprising:

connecting or disconnecting a particular processor from the one or more processors of the computer system, and updating the shared physical memory address space based upon the particular processor being connected or disconnected.

* * * * *